(12) United States Patent
Libby et al.

(10) Patent No.: US 10,354,008 B2
(45) Date of Patent: Jul. 16, 2019

(54) SYSTEM AND METHOD FOR PROVIDING A VISUAL SCROLL REPRESENTATION OF PRODUCTION DATA

(71) Applicant: ProductionPro Technologies Inc., Brooklyn, NY (US)

(72) Inventors: Alexander Libby, New York, NY (US); David Millman, New York, NY (US)

(73) Assignee: ProductionPro Technologies Inc., Brooklyn, NY (US)

(*) Notice: Subject to any disclaimer, the term of this patent is extended or adjusted under 35 U.S.C. 154(b) by 259 days.

(21) Appl. No.: 15/288,572

(22) Filed: Oct. 7, 2016

(65) Prior Publication Data

US 2018/0101582 A1    Apr. 12, 2018

(51) Int. Cl.
| | | |
|---|---|---|
| *G06F 17/00* | (2019.01) | |
| *G06F 17/27* | (2006.01) | |
| *G06F 17/21* | (2006.01) | |
| *G06F 17/22* | (2006.01) | |
| *G06F 16/44* | (2019.01) | |

(52) U.S. Cl.
CPC .......... *G06F 17/2765* (2013.01); *G06F 16/44* (2019.01); *G06F 17/211* (2013.01); *G06F 17/2264* (2013.01); *G06F 17/2705* (2013.01)

(58) Field of Classification Search
CPC . G06F 17/2765; G06F 17/211; G06F 17/2264
See application file for complete search history.

(56) References Cited

U.S. PATENT DOCUMENTS

| | | | | |
|---|---|---|---|---|
| 6,072,479 A | * | 6/2000 | Ogawa | G06F 17/30017 |
| 8,443,285 B2 | * | 5/2013 | Bachman | G06F 17/30017 |
| | | | | 715/716 |
| 9,002,177 B2 | * | 4/2015 | Greenberg | G06Q 10/06 |
| | | | | 386/278 |
| 2002/0078144 A1 | * | 6/2002 | Lamkin | G06F 17/30017 |
| | | | | 709/203 |
| 2005/0021754 A1 | * | 1/2005 | Alda | G06F 9/4488 |
| | | | | 709/225 |
| 2005/0228663 A1 | * | 10/2005 | Boman | G10L 15/26 |
| | | | | 704/235 |
| 2009/0024963 A1 | * | 1/2009 | Lindley | G06T 19/00 |
| | | | | 715/839 |

(Continued)

*Primary Examiner* — Stephen S Hong
*Assistant Examiner* — Marshon L Robinson
(74) *Attorney, Agent, or Firm* — Fenwick & West LLP

(57) ABSTRACT

Systems and methods for providing a visual scroll representation of production data on a display receive a digital script comprising production data, wherein the production data comprises a plurality of production elements; extract the plurality of production elements from the digital script; classify each of the plurality of production elements into one or more predefined classes; map at least one of the one or more predefined classes to one or more relations, wherein a relation represents a definable attribute of at least two predefined classes; determine a respective weight for each of the one or more relations; generate the visual scroll representation of the plurality of production elements, wherein visual representation of each of the one or more production elements is based at least in part on the determined weight of each of the one or more relations; and display the visual scroll representation on the display.

24 Claims, 5 Drawing Sheets

(56) References Cited

U.S. PATENT DOCUMENTS

| | | | |
|---|---|---|---|
| 2011/0107220 A1* | 5/2011 | Perlman | A63F 13/12 |
| | | | 715/720 |
| 2011/0307527 A1* | 12/2011 | Roenning | G06F 17/30041 |
| | | | 707/803 |
| 2012/0054617 A1* | 3/2012 | Bachman | G06F 17/30017 |
| | | | 715/723 |
| 2012/0096356 A1* | 4/2012 | Ubillos | G11B 27/034 |
| | | | 715/723 |
| 2012/0311448 A1* | 12/2012 | Achour | G06Q 10/101 |
| | | | 715/723 |
| 2013/0124984 A1* | 5/2013 | Kuspa | H04N 9/475 |
| | | | 715/255 |
| 2013/0151970 A1* | 6/2013 | Achour | H04N 21/854 |
| | | | 715/723 |
| 2014/0133834 A1* | 5/2014 | Shannon | H04N 9/80 |
| | | | 386/278 |
| 2015/0019982 A1* | 1/2015 | Petitt, Jr. | H04W 4/029 |
| | | | 715/738 |
| 2015/0074552 A1* | 3/2015 | Chai | H04N 21/482 |
| | | | 715/753 |
| 2015/0261403 A1* | 9/2015 | Greenberg | G06Q 10/06 |
| | | | 715/716 |
| 2017/0004140 A1* | 1/2017 | Wang | G06F 3/0488 |
| 2017/0068650 A1* | 3/2017 | Vostrikov | G06F 17/241 |
| 2017/0069354 A1* | 3/2017 | Wang | G11B 27/34 |

* cited by examiner

US 10,354,008 B2

SYSTEM AND METHOD FOR PROVIDING A VISUAL SCROLL REPRESENTATION OF PRODUCTION DATA

FIELD OF THE INVENTION

The present invention is in the fields of digital document analysis and graphical representation. In particular, the present invention is directed to a visual scroll representation of production data on a display.

BACKGROUND OF THE INVENTION

Currently creators of film, theatre and television, have no way to see the entirety of what they are creating. There is no overview of a production available while a production is being put together, and no version control, yet the versions change almost daily. Everything is still in many places and all on paper and PDFs. This leads to logistical issues, inefficient workflows, and daily headaches for all. Many products exist in the production industry which aim to enhance the productivity and efficiency of those working to create productions (e.g., films, televisions shows, theater shows and musicals, performances, etc.). Such products include screenwriting software, scheduling software, document management tools, collaboration software, for example.

However, in the process of going from script to production, there is typically a gap in which producers are forced to resort to a tried and true industry method: converting a script to storyboards in order to visualize a production prior to implementation. Storyboards allow creators to decide all the details which are not necessarily articulated in the script, such as, for example, which actors should play which parts, what props should be used, layout of the scenery, etc. This process in an arduous and time-consuming task, particularly given the fact that there are often many collaborators involved in the creative process of bringing a script to production. Directors, producers, screenplay writers, actors, stage managers, etc., may all provide different points of input, making organization and implementation of various ideas challenging.

What is needed, therefore, is the missing link between the initial script and the finished product. Such a solution would provide a global view of the production process, enabling users to watch their work come to life as the concepts and choices are gathered and come together to form a story. Further a solution is needed such that a script can be quickly and efficiently analyzed and converted into a visual storyboard, providing a global view to all collaborators, and enabling them to collectively work to create a production.

SUMMARY OF EMBODIMENTS OF THE INVENTION

Embodiments of the invention include a system and method of providing a visual scroll representation of production data on a display. Embodiments may be performed on a computer having a processor, memory, and one or more code sets stored in the memory and executing in the processor. In some embodiments, the method may include receiving a digital script including production data, in which the production data includes a plurality of production elements; extracting the plurality of production elements from the digital script; classifying each of the plurality of production elements into one or more predefined classes; mapping at least one of the one or more predefined classes to one or more relations, in which a relation represents a definable attribute of at least two predefined classes; determining a respective weight for each of the one or more relations; generating the visual scroll representation of the plurality of production elements, in which visual representation of each of the one or more production elements is based at least in part on the determined weight of each of the one or more relations; and displaying the visual scroll representation on the display.

In some embodiments, the digital script may include a collection of digital pages comprising the production data. In some embodiments, the production data may include at least one of text, one or more images, geographic information, and temporal data. In some embodiments, the one or more production elements may be extracted using at least one of Optical Character Recognition and Natural Language Processing. In some embodiments, the one or more production elements may be mapped using at least one of Natural Language Processing, statistical data, and one or more Graph algorithms.

In some embodiments, classifying the production data may further include selecting a random sampling from the digital script, the random sampling including at least one portion of the production data; applying each of a bank of pre-determined script format classifiers to the random sampling; calculating a feasibility score for each pre-determined script format classifier in the bank of pre-determined script format classifiers; identifying a best fit pre-determined script format classifier based at least in part on the calculated feasibility scores; and parsing the rest of the production data in the digital script based at least in part on the identified best fit of the pre-determined script format classifier.

In some embodiments, determining the respective weight for each of the one or more relations may further include ascribing to each element a vertex in a graph model simulation, in which each element is represented by its ascribed vertex; linking all vertices by one or more edges when there exists a relation between two elements in which the vertices are ascribed; and assigning the weight to each edge based on a least one of the one or more relations.

In some embodiments, generating the visual scroll representation of the plurality of production elements based at least in part on the determined weight of each of the one or more relations may further include determining a tally of a least some of the vertices for at least some of the edges in with the vertex is a member; assigning the tally of each vertex to its corresponding element; and determining, based on each of the tallies, a proportional size for each of a plurality of vertical visual elements and for each of a plurality of horizontal visual elements; in which the plurality of vertical and horizontal visual elements represent at least some of the classified elements.

In some embodiments, the plurality of vertical elements may include at least one of one or more acts and one or more scenes; and the plurality of horizontal elements may include at least one of characters, musical numbers, props, costumes, and set transitions. In some embodiments, elements representing a character with a higher weight may occupy a higher position in the visual scroll than elements representing a character with a lower weight. In some embodiments, elements representing a character appearing in consecutive scenes may be formed as a chain; and each chain's cumulative weight may determine its hierarchal position in the visual scroll.

Some embodiments may further include receiving a second version of the digital script including second production data, in which the second production data includes a plurality of second production elements; classifying each of the plurality of second production elements into the one or more predefined classes; mapping at least one of the one or more predefined classes to one or more of the relations; comparing the production data of the digital script and the second production data of the second version of the digital script; determining a best fit version score between the plurality of production elements and the plurality of second production elements; and outputting any similarities and/or differences between the production data and the second production data.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
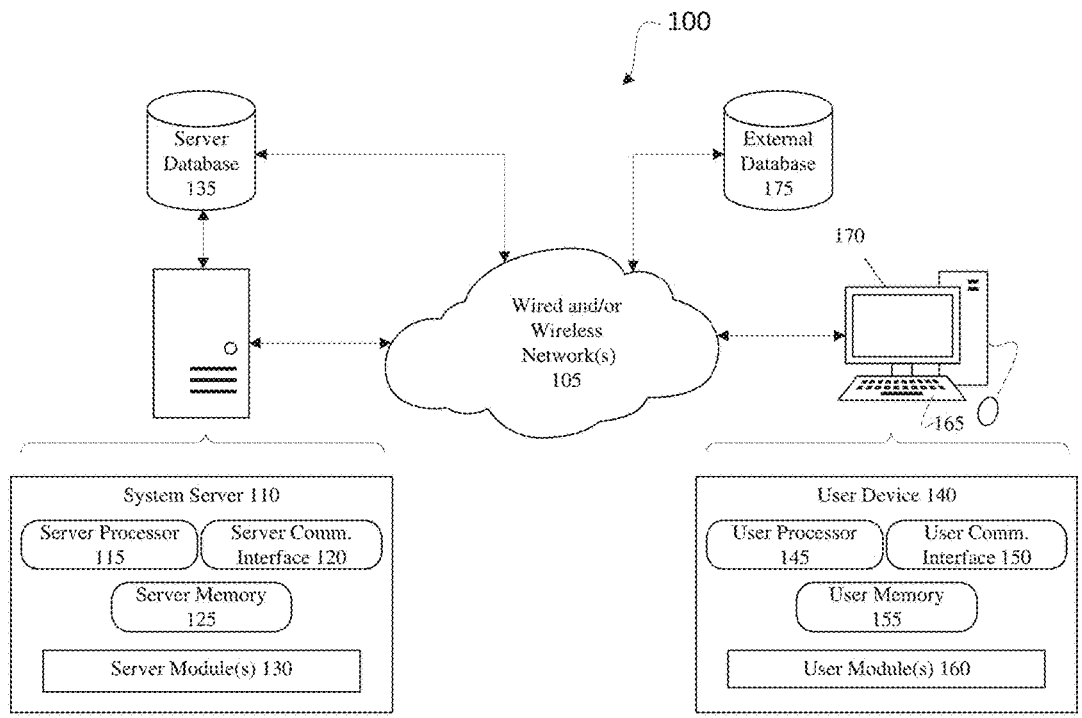
FIG. 1 is a high level diagram illustrating an example configuration of a system for providing a visual scroll representation of production data on a display.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention provide an automated system and method for providing a visual scroll representation of production data on a display, by for example, analyzing a digital script and converting the production data extracted therefrom into a visual scroll, as described herein. Production data, as understood herein, may refer to an organized collection of data consisting of scripts, media, and metadata.

Embodiments of the invention implement a technique for visualizing words and ideas within the context of a production. The visualization helps creators understand their work as they build it, streamlining their creative and collaborative processes.

Embodiments of the invention allow users to fully visualize and "watch" their production far before it hits the stage or edit room, e.g., by using a visual scroll representation (hereinafter "visual scroll") as the backbone of its user interface. This presents all collaborators with the full picture at every moment, allowing complete confidence in every decision and change made to the production. Further embodiments weave together multilevel facets of the production process, embedding and integrating each discipline into a single platform which, in some embodiments, may be remotely accessed through native mobile device applications and/or web based platforms. Embodiments of the invention streamline the challenging nuances inundating the production industry by eliminating repetitive tasks and allowing for instant communication and continual momentum within a highly collaborative creative process. Further embodiments of the invention give users quick access to all productions they are working on through their personalized production library. Every user is able to add new productions, sync into existing productions with coworkers and/or other collaborators, or even just begin to visualize a new idea, quickly and simply with little to no data entry.

Further embodiments of the invention provide a Scene Library, which, in some embodiments, may be an integrated application that enables users to view and organize media attached to a scene. Media may be added or removed from the scene. Media may be archived or unarchived. Media may be placed in a group or removed from a group. The Scene Library may also be used to set a poster image, which may be a selected specific desired visual for a representing a scene. In some embodiments, each Production Member may maintain a personal ordering of the items in the Scene Library, while the content may be stored on a shared server.

These and other features of embodiments of the invention will be further understood with reference to FIGS. 1-4 as described herein, as well as in the APPENDIX to this application.

FIG. 1 shows a high level diagram illustrating an example configuration of a system 100 for providing a visual scroll representation of production data on a display, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to chip-design testing and analysis, and other functions of embodiments of the invention as will be described in greater detail below. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents or other aspects of the production (media, communications, notes, etc. In some embodiments, database 135 may store information related to analysis of those and other items.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, create and/or provide one or more documents for system server 110 to analyze, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
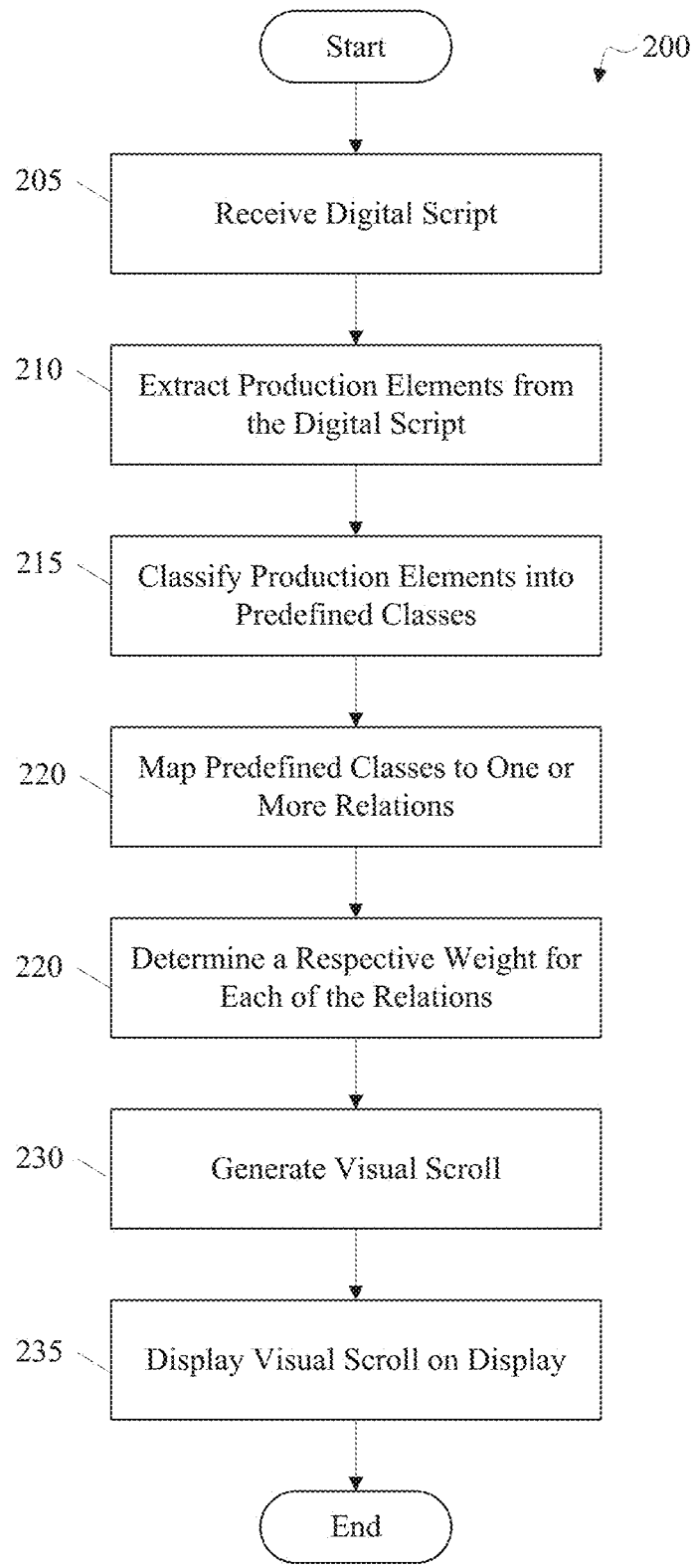
FIG. 2 is a flow diagram of a method of providing a visual scroll representation of production data on a display according to at least one embodiment of the invention.

FIG. 2 is a flow diagram of a method 200 of providing a visual scroll representation of production data on a display, according to at least one embodiment of the invention. In some embodiments, method 200 may be performed on a computer (e.g., system server 110) having a processor (e.g., server processor 115), memory (e.g., server memory 125), and one or more code sets (e.g., server module(s) 130) stored in the memory and executing in the processor. The method begins at step 205, when a data file (e.g., the digital script) having production data therein is received at the processor. The digital script is typically provided in the form of one or more digital documents (hereinafter "documents") and may include a collection of digital pages which include the production data. A document (and the production data therein) is typically a sequence of characters, e.g., forming words, sentences, paragraphs, chapters, etc. In order to analyze the content in a document (e.g., the information expressed in text, media, etc.), this sequence may undergo a number of preprocessing steps, as described herein. In some embodiments, the production data may include one or more (e.g., a plurality) production elements. As understood herein, production elements, or simply "elements," may be understood as any or all the various details of import to a production, such as, for example, actors, props, sets, locations, acts, scenes, lines, musical numbers, costumes, set transitions, etc.

At step 210, in some embodiments, the processor may extract one or more, e.g., all, of the plurality of elements from the digital script. In some embodiments, the digital script may include a collection of digital pages comprising the production data and the plurality of elements therein. In some embodiments, the digital script may be a digital file representing a paper version of a script, such as, e.g., a .DOC or .PDF format document. In some embodiments, the production data may include text, one or more images, geographic information (e.g., an address or name of a location), and/or temporal data (time of day, date, etc.). In some embodiments, the elements may be extracted using, e.g., Optical Character recognition, Natural Language Processing (NLP), and/or any other extraction method as known to one of ordinary skill in the art.

At step 215, in some embodiments, the processor may classify each of the plurality of elements into one or more classes, each class having one or more elements. In some embodiments, one or more classes may be predefined classes. In some embodiments, there may be many classes of elements, and/or many elements in each class.

Figure 3:
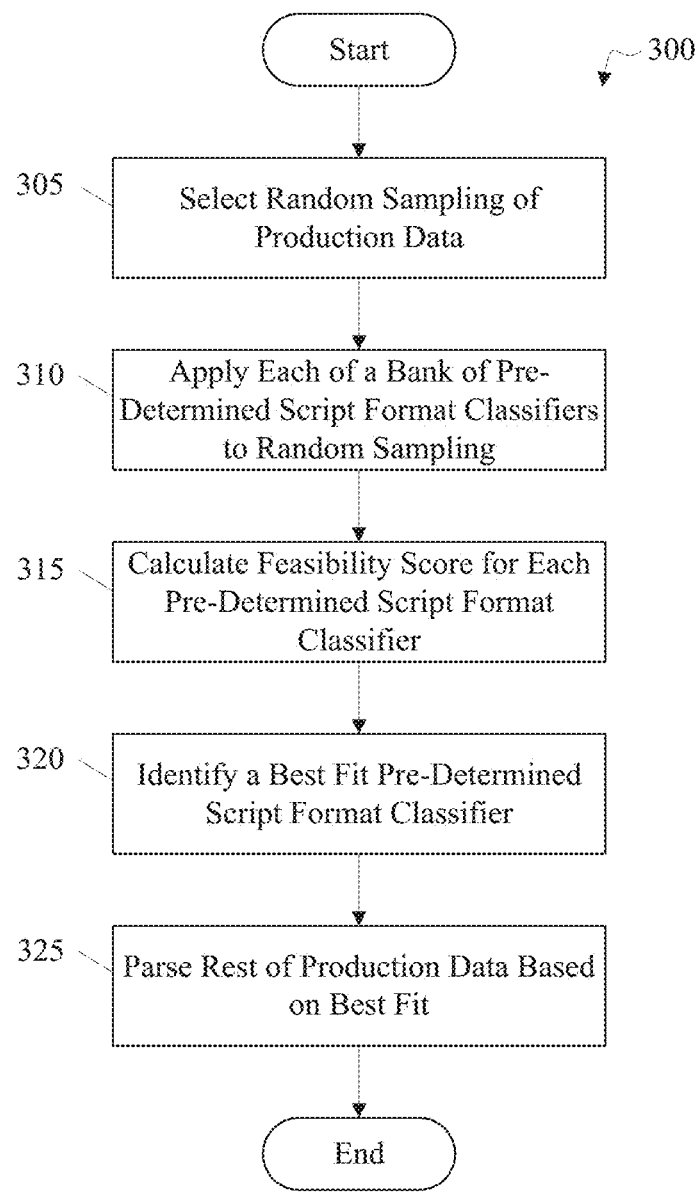
FIG. 3 is a flow diagram of a method of classifying production data according to at least one embodiment of the invention.

Turning briefly to FIG. 3, in some embodiments, in order to determine the classes of elements, at step 305 the processor may first select a random sampling from the digital script, the random sampling including at least one portion and typically one or more portions of the production data (and one or more elements in the production data). At step 310, in some embodiments, the processor may then apply, e.g., a bank of one or more pre-determined script format classifiers to the random sampling. As understood herein, a script format classifier enables a portion of production data to be evaluated to determine whether the portion conforms in any way with the script format classifier. At step 315, in some embodiments, the processor may then calculate a feasibility score for each pre-determined script format classifier in the bank of pre-determined script format classifiers. For example, a feasibility score may reflect a feasibility of classifying a particular portion of the production data based on a given pre-determined script format classifier. In some embodiments, this may be represented a percentage or other numerical value.

At step 320, in some embodiments, a best fit pre-determined script format classifier for each portion of the production data in the random sampling may be identified based at least in part on the calculated feasibility scores. Finally, at step 325, in some embodiments, the processor may parse the rest of the production data in the digital script based at least in part on the identified best first pre-determined script format classifier.

Returning to FIG. 2, at step 220, the processor may map at least one of the one or more predefined classes to one or more relations. A relation, as understood herein, represents a definable attribute of at least two predefined classes. In some embodiments, the script may be mapped using a hierarchy of text structures and/or persistent homology methods as are known to those in the art. For example, if one element is a "hat" in a "wardrobe" class, and a particular actor is an element in an "actor" class, in an embodiment in which the actor wears the hat in a particular location, a relation may be mapped between the class "wardrobe" and the class "actor" representing the definable attribute linking the two classes, e.g., the shared location.

At step 225, in some embodiments, the processor may determine a respective weight for each of the one or more relations. A weight, as understood herein, is a representation of the relative relevance of the particular relation, and/or the underlying elements, to the production.

Figure 4:
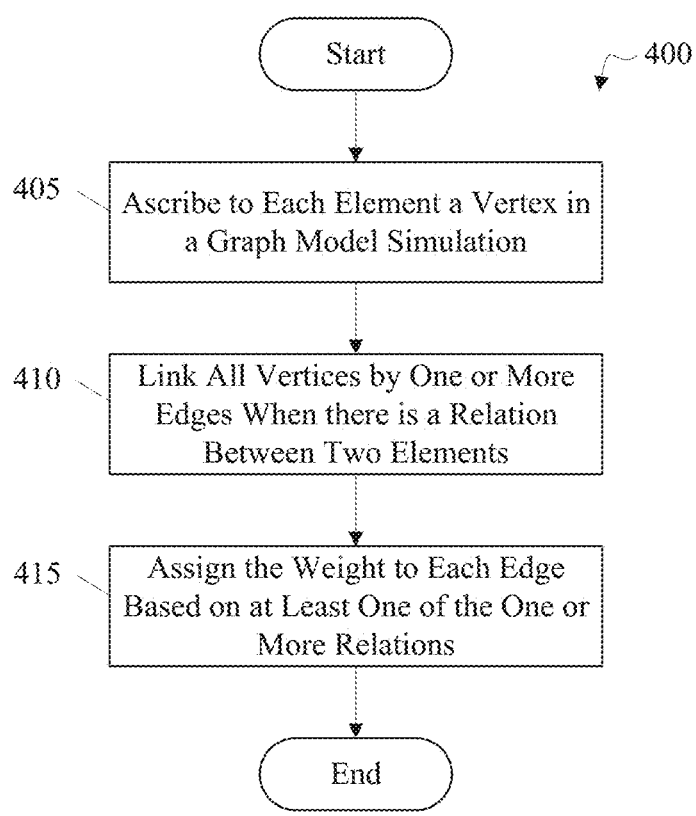
FIG. 4 is a flow diagram of a method of determining respective weights of classified elements according to at least one embodiment of the invention.

Turning briefly to FIG. 4, in some embodiments, to determine the weight for each of the one or more relations, at step 405, the processor may ascribe to each element a vertex in a graph model simulation, wherein each element is represented by its ascribed vertex. At step 410, the processor may link all vertices by one or more edges (e.g., of the vertices) when there exists a relation between two elements in which the vertices are ascribed. And at step 415, the processor may assign the weight to each edge base on at least one of the one or more relations.

At step 230, the processor may generate the visual scroll representation of the plurality of production elements. In some embodiments, the visual representation of each of the one or more production elements may be based, for example, at least in part on the determined weight of each of the one or more relations. In some embodiments, generating the visual scroll may include determining, by the processor, a tally of a least some of the vertices for at least some of the edges in with the vertex is a member. In some embodiments the processor may then assign the tally of each vertex to its corresponding element. Finally, the processor may determine, e.g., based on each of the tallies, a proportional size for each of a plurality of vertical visual elements (e.g., forming columns) and/or for each of a plurality of horizontal visual elements (e.g., forming rows), the plurality of vertical and horizontal visual elements representing the classified elements.

Figure 5:
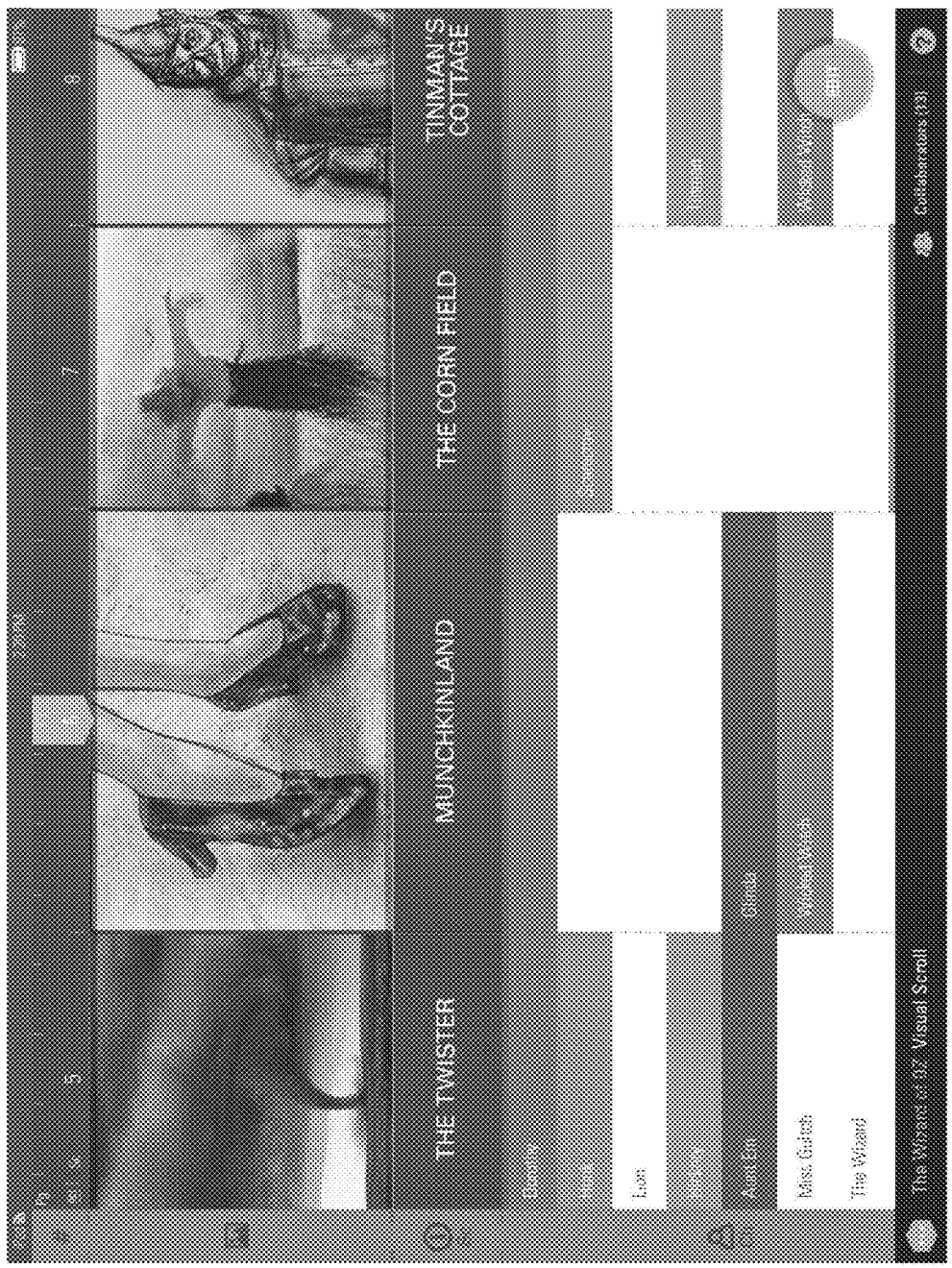
FIG. 5 is an example visual representation, shown according to embodiments of the invention.

Turning briefly to FIG. 5, an example visual representation is shown according to embodiments of the invention. A proportional size may be determined based on, among other things, the dimensions of the display, the number of elements, etc. In some embodiments, the plurality of vertical elements may include at least one of one or more acts and/or one or more scenes; and the plurality of horizontal elements may include at least one of characters, musical numbers, props, costumes, and/or set transitions, etc. Of course, other configurations are also possible as desired.

In some embodiments, elements representing a character with a higher weight may occupy a higher position in the visual scroll than elements representing a character with a lower weight. For example, a lead character in a production may have a higher weight that an "extra" that only has a small role, and the lead character may therefore be represented higher up in the visual scroll. Of course, in some embodiments, positions may be modulated in the visual scroll throughout the production, e.g., depending on which elements are in a particular scene, etc. In some embodiments, elements representing a character appearing in consecutive scenes may be formed as a chain. In some embodiments, each chain's cumulative weight may determine its hierarchal position in the visual scroll.

Finally, at step 230, the visual scroll may be displayed on the display. Critically, because the entire digital script has been mapped, and the visual scroll has been generated using elements classified from the digital script, in some embodiments, the visual scroll may be integrally coupled to the digital script such that navigating to any point in the digital script allows may cause the visual scroll to automatically navigate to the same location as the digital script and vice versa. In embodiments where the device on which the digital script and visual scroll are displayed is a mobile device having, e.g., gyroscopic sensors, in some embodiments, orienting the device in a portrait mode may cause the device to display the digital script, whereas orienting the device in a landscape mode may cause the device to display the visual scroll. Of course, in other embodiments, the display may be changed without requiring re-orientation of the device or display.

Often, a revised version of a digital script may be produced. Therefore, in some embodiments of the invention, the processor may receive a second version of the digital script comprising second production data, in which the second production data includes a plurality of second production elements. The processor may then classify each of the plurality of second production elements into the one or more predefined classes as described herein. Then, in some embodiments, the processor may map at least one of the one or more predefined classes to one or more of the relations. In some embodiments, the processor may then compare the production data of the digital script and the second production data of the second version of the digital script, and determine a best fit version score between the plurality of production elements and the plurality of second production elements. Finally, in some embodiments, the processor may output any similarities and/or differences between the production data and the second production data.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of providing a visual scroll representation of production data on a display, performed on a computer having a processor, memory, and one or more code sets stored in the memory and executing in the processor, the method comprising:
   receiving, at the processor, a digital script comprising production data, wherein the production data comprises a plurality of production elements;
   extracting, by the processor, the plurality of production elements from the digital script;
   classifying, by the processor, each of the plurality of production elements into one or more predefined classes;
   mapping, by the processor, at least one of the one or more predefined classes to one or more relations, wherein a relation represents a definable attribute of at least two predefined classes;
   determining, by the processor, a respective weight for each of the one or more relations wherein each weight represents a relevance of the relation to a production associated with the digital script;
   generating, by the processor, the visual scroll representation of the plurality of production elements, wherein visual representation of each of the plurality of production elements is based at least in part on the determined weight of each of the one or more relations; and
   providing, by the processor, the visual scroll representation for display.

2. The method as in claim 1, wherein the digital script comprises a collection of digital pages comprising the production data.

3. The method as in claim 1, wherein the production data comprises at least one of text, one or more images, geographic information, and temporal data.

4. The method as in claim 1, wherein the plurality of production elements are extracted using at least one of Optical Character Recognition and Natural Language Processing.

5. The method as in claim 1, wherein the plurality of production elements are mapped using at least one of Natural Language Processing, statistical data, and one or more Graph algorithms.

6. The method as in claim 1, wherein classifying each of the plurality of production elements comprises:
selecting, by the processor, a random sampling from the digital script, the random sampling comprising at least one portion of the production data;
applying, by the processor, each of a bank of pre-determined script format classifiers to the random sampling;
calculating, by the processor, a feasibility score for each pre-determined script format classifier in the bank of pre-determined script format classifiers;
identifying, by the processor, a best fit pre-determined script format classifier based at least in part on the calculated feasibility scores; and
parsing, by the processor, a rest of the production data in the digital script based at least in part on the identified best fit of the pre-determined script format classifier.

7. The method as in claim 1, wherein determining the respective weight for each of the one or more relations further comprises:
ascribing, by the processor, to each production element, a vertex in a graph model simulation, wherein each production element is represented by its ascribed vertex;
linking, by the processor, all vertices by one or more edges when there exists a relation between two production elements in which the vertices are ascribed; and
assigning, by the processor, the weight to each edge based on at least one of the one or more relations.

8. The method as in claim 1, wherein generating the visual scroll representation of the plurality of production elements based at least in part on the determined weight of each of the one or more relations further comprises:
determining, by the processor, a tally of at least some of the vertices for at least some of the edges in which the vertex is a member;
assigning, by the processor, the tally of each vertex to its corresponding element; and
determining, by the processor, based on each of the tallies, a proportional size for each of a plurality of vertical visual elements and for each of a plurality of horizontal visual elements;
wherein the plurality of vertical and horizontal visual elements represent at least some of the classified elements.

9. The method as in claim 8, wherein the plurality of vertical elements comprise at least one of one or more acts and one or more scenes; and wherein the plurality of horizontal elements comprise at least one of characters, musical numbers, props, costumes, and set transitions.

10. The method as in claim 8, wherein elements representing a character with a higher weight occupy a higher position in the visual scroll than elements representing a character with a lower weight.

11. The method as in claim 8, wherein elements representing a character appearing m consecutive scenes are formed as a chain; and wherein each chain's cumulative weight determines its hierarchal position in the visual scroll.

12. The method as in claim 6, further comprising:
receiving, at the processor, a second version of the digital script comprising second production data, wherein the second production data comprises a plurality of second production elements;
classifying, by the processor, each of the plurality of second production elements into the one or more predefined classes;
mapping, by the processor, at least one of the one or more predefined classes to one or more of the relations;
comparing, by the processor, the production data of the digital script and the second production data of the second version of the digital script;
determining a best fit version score between the plurality of production elements and the plurality of second production elements; and
outputting any similarities and differences between the production data and the second production data.

13. A system for providing a visual scroll representation of production data on a display comprising:
a computer having a processor and memory,
and one or more code sets stored in the memory and executing in the processor, which, when executed, configure the processor to:
receive a digital script comprising production data, wherein the production data comprises a plurality of production elements;
extract the plurality of production elements from the digital script;
classify each of the plurality of production elements into one or more predefined classes;
map at least one of the one or more predefined classes to one or more relations, wherein a relation represents a definable attribute of at least two predefined classes;
determine a respective weight for each of the one or more relations, herein each weight represents a relevance of the relation to a production associated with the digital script;
generate the visual scroll representation of the plurality of production elements, wherein visual representation of each of the plurality of production elements is based at least in part on the determined weight of each of the one or more relations; and
provide the visual scroll representation for display.

14. The system of as in claim 13, wherein the digital script comprises a collection of digital pages comprising the production data.

15. The system as in claim 13, wherein the production data comprises at least one of text, one or more images, geographic information, and temporal data.

16. The system as in claim 13, wherein the plurality of production elements are extracted using at least one of Optical Character Recognition and Natural Language Processing.

17. The system as in claim 13, wherein the plurality of production elements are mapped using at least one of Natural Language Processing, statistical data, and one or more graph algorithms.

18. The system as in claim 13, wherein, when classifying each of the plurality of production elements, the processor is further configured to:
select a random sampling from the digital script, the random sampling comprising at least one portion of the production data;
apply each of a bank of pre-determined script format classifiers to the random sampling;

calculate a feasibility score for each pre-determined script format classifier in the bank of pre-determined script format classifiers;

identify a best fit pre-determined script format classifier based at least in part on the calculated feasibility scores; and parse a rest of the production data in the digital script based at least in part on the identified best fit of the pre-determined script format classifier.

19. The system as in claim 13, wherein, when determining the respective weight for each of the one or more relations, the processor is further configured to:

ascribe to each production element a vertex in a graph model simulation, wherein each production element is represented by its ascribed vertex;

link all vertices by one or more edges when there exists a relation between two production elements in which the vertices are ascribed; and assign the weight to each edge based on at least one of the one or more relations.

20. The system as in claim 19, wherein, when generating the visual scroll representation of the plurality of production elements based at least in part on the determined weight of each of the one or more relations, the processor is further configured to:

determine a tally of at least some of the vertices for at least some of the edges in which the vertex is a member;

assign the tally of each vertex to its corresponding element; and determine, based on each of the tallies, a proportional size for each of a plurality of vertical visual elements and for each of a plurality of horizontal visual elements;

wherein the plurality of vertical and horizontal visual elements represent at least some of the classified elements.

21. The system as in claim 20, wherein the plurality of vertical elements comprise at least one of one or more acts and one or more scenes; and wherein the plurality of horizontal elements comprise at least one of characters, musical numbers, props, costumes, and set transitions.

22. The system as in claim 20, wherein elements representing a character with a higher weight occupy a higher position in the visual scroll than elements representing a character with a lower weight.

23. The system as in claim 20, wherein elements representing a character appearing in consecutive scenes are formed as a chain; and wherein each chain's cumulative weight determines its hierarchal position in the visual scroll.

24. The system as in claim 18, wherein the processor is further configured to:

receive a second version of the digital script comprising second production data, wherein the second production data comprises a plurality of second production elements;

classify each of the plurality of second production elements into the one or more predefined classes;

map at least one of the one or more predefined classes to one or more of the relations;

compare the production data of the digital script and the second production data of the second version of the digital script;

determine a best fit version score between the plurality of production elements and the plurality of second production elements; and output any similarities and differences between the production data and the second production data.

* * * * *

UNITED STATES PATENT AND TRADEMARK OFFICE
CERTIFICATE OF CORRECTION

PATENT NO. : 10,354,008 B2
APPLICATION NO. : 15/288572
DATED : July 16, 2019
INVENTOR(S) : Libby et al.

Page 1 of 1

It is certified that error appears in the above-identified patent and that said Letters Patent is hereby corrected as shown below:

In the Claims

In Column 11, Claim 11, Line 65, delete "appearing m" and insert -- appearing in --, therefor.

In Column 12, Claim 13, Line 37, delete "herein" and insert -- wherein --, therefor.

In Column 12, Claim 14, Line 46, delete "of as in" and insert -- as in --, therefor.

Signed and Sealed this
Third Day of December, 2019

Andrei Iancu
*Director of the United States Patent and Trademark Office*